(12) United States Patent
Papautsky et al.

(10) Patent No.: US 9,987,632 B2
(45) Date of Patent: Jun. 5, 2018

(54) MICROFLUIDIC METHODS FOR PASSIVE SEPARATION OF CELLS AND PARTICLES

(71) Applicant: University of Cincinnati, Cincinnati, OH (US)

(72) Inventors: Ian Papautsky, Mason, OH (US); Jian Zhou, Cincinnati, OH (US)

(73) Assignee: University of Cincinnati, Cincinnati, OH (US)

( * ) Notice: Subject to any disclaimer, the term of this patent is extended or adjusted under 35 U.S.C. 154(b) by 0 days. days.

(21) Appl. No.: 14/376,450

(22) PCT Filed: Feb. 1, 2013

(86) PCT No.: PCT/US2013/024403
§ 371 (c)(1),
(2) Date: Aug. 4, 2014

(87) PCT Pub. No.: WO2013/116696
PCT Pub. Date: Aug. 8, 2013

(65) Prior Publication Data
US 2014/0374324 A1    Dec. 25, 2014

Related U.S. Application Data

(60) Provisional application No. 61/594,732, filed on Feb. 3, 2012.

(51) Int. Cl.
*B07B 7/00*    (2006.01)
*B01L 3/00*    (2006.01)
(Continued)

(52) U.S. Cl.
CPC ..... *B01L 3/502761* (2013.01); *B01J 19/0093* (2013.01); *B01L 3/502753* (2013.01);
(Continued)

(58) Field of Classification Search
CPC ......... B01L 3/502761; B01L 3/502776; B01L 3/502753
See application file for complete search history.

(56) References Cited

U.S. PATENT DOCUMENTS 6,591,852 B1 *   7/2003   McNeely ............. B01F 5/0403
                                                              137/14
7,964,078 B2 *   6/2011   Lee .................... B01L 3/502761
                                                              204/547
(Continued)

FOREIGN PATENT DOCUMENTS

WO    WO 2011109762 A1 *  9/2011  .......... B01L 3/50273

*Primary Examiner* — Jeremy R Severson
(74) *Attorney, Agent, or Firm* — Wood Herron & Evans LLP

(57) ABSTRACT

A method of separating a plurality of particles (14) from a portion of fluid, comprising directing the plurality of particles (14) into a microchannel (12). A first portion (16) of particles (14) is focused into an equilibrium position in the microchannel (12). The focused first portion (16) is directed into a first outlet (18) aligned with the equilibrium position. A portion of the fluid is directed into one or more outlets (20, 22). A microfluidic device (10) for separating a plurality of particles (14) from a portion of fluid, comprising a microchannel (12) having a first aspect ratio and a length L, thereby focusing the particles (14) directed therein into an equilibrium position in the microchannel, wherein at least a first portion (16) of the particles (14) focuses at distance X from a beginning of the microchannel (12). A first outlet (18) disposed after distance X and aligned with the equilibrium position to receive at least the first portion (16) of the particles (14) after the first portion (16) focuses into an equilibrium position in the microchannel (12). At least a second outlet (20) for receiving a second portion of the particles (14) before the second portion focuses into an equilibrium position.

28 Claims, 13 Drawing Sheets

(51) Int. Cl.
*B01J 19/00* (2006.01)
*B03B 5/62* (2006.01)
(52) U.S. Cl.
CPC .......... *B01L 3/502776* (2013.01); *B03B 5/62* (2013.01); *B07B 7/00* (2013.01); *B01J 2219/00889* (2013.01); *B01J 2219/00891* (2013.01); *B01J 2219/00905* (2013.01); *B01J 2219/00984* (2013.01); *B01L 2200/0636* (2013.01); *B01L 2200/0652* (2013.01); *B01L 2300/0816* (2013.01); *B01L 2300/0864* (2013.01); *Y10T 137/0318* (2015.04)

(56) References Cited

U.S. PATENT DOCUMENTS

| | | | | |
|---|---|---|---|---|
| 2006/0134599 | A1* | 6/2006 | Toner | B01L 3/502746 435/4 |
| 2009/0014360 | A1* | 1/2009 | Toner | B01D 21/0087 209/208 |
| 2009/0286300 | A1* | 11/2009 | Le Vot | B01F 3/0807 435/177 |
| 2010/0285606 | A1* | 11/2010 | Phillips | B01L 3/502761 436/501 |
| 2011/0096327 | A1* | 4/2011 | Papautsky | B01D 21/0087 356/335 |
| 2014/0374324 | A1* | 12/2014 | Papautsky | B01L 3/502753 209/132 |

* cited by examiner

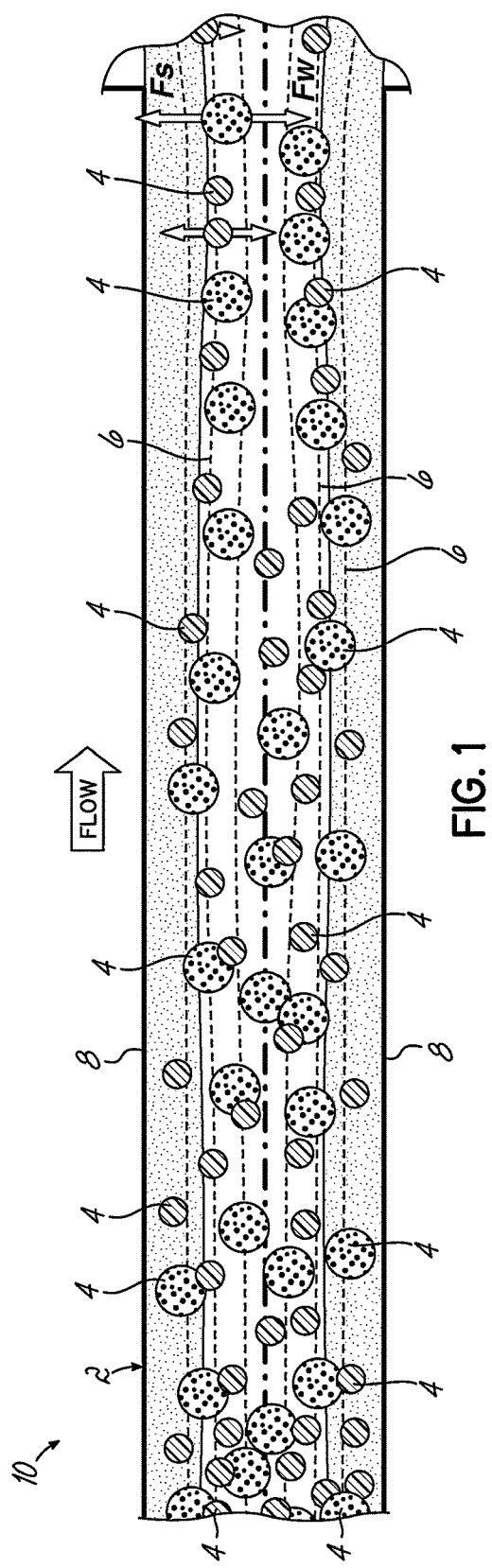

MICROFLUIDIC METHODS FOR PASSIVE SEPARATION OF CELLS AND PARTICLES

CROSS-REFERENCE TO RELATED APPLICATIONS

This application is a submission under 35 U.S.C. § 371 of International Application No. PCT/US2013/024403, filed Feb. 1, 2013, which claims priority to U.S. Provisional Patent Application Ser. No. 61/594,732, filed Feb. 3, 2012, the disclosures of which are hereby expressly incorporated by reference herein in their entireties.

FIELD

The present invention relates generally to microfluidic devices and methods for passive separation of cells and particles, and more specifically to separation of cells and particles in microchannels.

BACKGROUND

Size-based passive particle or cell separation and filtration techniques are essential in many environmental and biological applications, including cell separations in cancer therapy, removal of colloidal and supracolloidal residues from wastewater effluents, and filtration of pathogenic bacteria strains such as *E. coli* O157:H7 from water. Recently, questions have been raised regarding nano- and micro-particle exposure which may have adverse effects on human and animal health. As the use of nanoparticles in manufacturing increases, a growing need to filter particles of nanometer scale from fluids is anticipated. Moreover, in most laboratory-on-a-chip (LOC) applications require continuous on-chip filtration and separation of particles for fast analysis and detection. Conventional micro/nanoparticle filtration systems, including LOCs, traditionally employ membrane-based filtering. The limitations of membrane clogging and pore size make this approach less than optimal and expensive for separating a wide range of particle sizes. This has triggered the recent development of many microscale membrane-free filtration methods for efficient and cost-effective particle filtration, including field-flow fractionation and electrophoresis. However, most of these filtration techniques are active microfluidic systems that require an external force field (e.g., electric field), which often leads to increased design complexity. Thus, developing passive high-throughput filtration methods that offer high filtration efficiency over a wide range of particle or cell shapes and sizes is desired.

SUMMARY

In one embodiment according to the present invention, a method of separating a plurality of particles from a portion of fluid is provided. The method comprises directing the plurality of particles into a microchannel and focusing a first portion of the particles into an equilibrium position in the microchannel. The method further comprises directing the focused first portion of the particles into a first outlet aligned with the equilibrium position, and directing a portion of the fluid into one or more different outlets.

According to another embodiment, a microfluidic device for separating a plurality of particles from a portion of fluid is provided. The device comprises a microchannel having a low aspect ratio and a length L, thereby focusing the particles directed therein into an equilibrium position in the microchannel, wherein at least a first portion of the particles focuses at distance X from a beginning of the microchannel. The device further comprises a first outlet disposed after distance X and aligned with the equilibrium position to receive at least the first portion of the particles after the first portion focuses into an equilibrium position in the microchannel. The device further comprises at least a second outlet for receiving a second portion of the particles before the second portion focuses into an equilibrium position.

In another embodiment, a microfluidic device for separating particles is provided. The device comprises a first, upstream microchannel having a first aspect ratio and a length L1 in order to allow the particles directed therein to focus into a first equilibrium position in the first microchannel. The device further comprises a second, downstream microchannel in fluid communication with the first microchannel, the second microchannel having a second aspect ratio and a length L2, whereby at least a portion of the particles directed into the second microchannel exit the first equilibrium position and experience a first migration away from a center axis of second microchannel and towards walls of the second microchannel, and a second migration towards a second equilibrium position. The second migration to the second equilibrium position ends at distance X from a beginning of the second microchannel. The device further comprises a plurality of outlets disposed before distance X and configured to receive the portion of the particles during the second migration thereof before the portion of the particles focuses to the second equilibrium position in the second microchannel.

In yet another embodiment according to the present invention, a method of separating a plurality of particles from a portion of a fluid medium is provided. The method comprises directing the plurality of particles into a first microchannel having a first aspect ratio and length L1 and focusing at least a portion of the particles into a first equilibrium position in the first microchannel. The method further comprises directing the particles into a second microchannel in fluid communication with the first microchannel, the second microchannel having a second aspect ratio and length L2, whereby at least a portion of the particles experience a first migration away from a center axis of second microchannel and towards walls of the second microchannel, and a second migration to a second equilibrium position. The second migration ends at distance X from a beginning of the second microchannel. The method further comprises directing at least the portion of the particles into a plurality of outlets in fluid communication with the second microchannel during the second migration before the portion of the particles focuses to the second equilibrium position by positioning a plurality of outlets before X.

In another embodiment, a method of separating a plurality of particles from a portion of a fluid medium is provided. The method comprises directing the plurality of particles into a microchannel having a first aspect ratio and length $L_1$ and focusing at least a portion of the particles into a first equilibrium position in the microchannel. The method further comprises directing the particles into a chamber in fluid communication with the microchannel. The chamber has a second aspect ratio and further comprises symmetric first and second capture portions, wherein the first capture portion has a first outlet and the second capture portion has a second outlet. The chamber further comprises a third outlet aligned with the microchannel, thereby defining a main flow area in the chamber between the microchannel and main outlet, the main flow area also defined as being between the first and second capture portions. Upon entering the chamber, the equilibrium position of the particles changes and the particles migrate away from a center axis of the chamber. The particles experience a first migration away from a center axis of the chamber, wherein a first portion of the particles migrating out of the main flow area enter the first and second capture portions. The method further comprises directing the first portion of particles entering the first and second capture portion in the first and second chamber outlets, and directing a second portion particles remaining in the main flow area in the main outlet.

In another embodiment, a microfluidic device for separating a plurality of particles from a fluid medium is provided. The device further comprises a microchannel having a first aspect ratio and a length $L_1$ in order to allow the particles directed therein to focus into a first equilibrium position in the microchannel and a chamber in fluid communication with the microchannel and having a second aspect ratio. The chamber further comprises symmetric, first and second capture portions, each capture portion communicating with first and second chamber outlets, respectively, and the chamber communicating with a main outlet, thereby defining a main flow area in the chamber between the microchannel and main outlet, the main flow area also defined as being between the first and second capture portions. Upon entering the chamber, the equilibrium position of the particles changes and the particles experience a first migration away from a center axis of the chamber. When the first migration causes the particles to leave the main flow area, the particles migrate into the capture portions. When the particles remain in the main flow area during the first migration, the particles further experience a second migration towards a second equilibrium position and are directed into from the main outlet. The device further comprises first and second chamber outlets communicating with the first and second capture chambers, the first and second chamber outlets receiving particles that migrate into the first and second capture portions.

Notably, the device and method disclosed herein is able to be utilized for a wide range of particles and cells. For example, the device and method could be used to separate cells and particles having normal shapes for a specific type of cell, such as a healthy, single red blood cell, or abnormal shapes, such as sickle shaped red blood cells or aggregated cells (i.e., single cells bunched together), or a combination of both. When cells are mentioned herein, it is meant to also encompass various types of particles, and vice versa.

BRIEF DESCRIPTION

Figure 2:
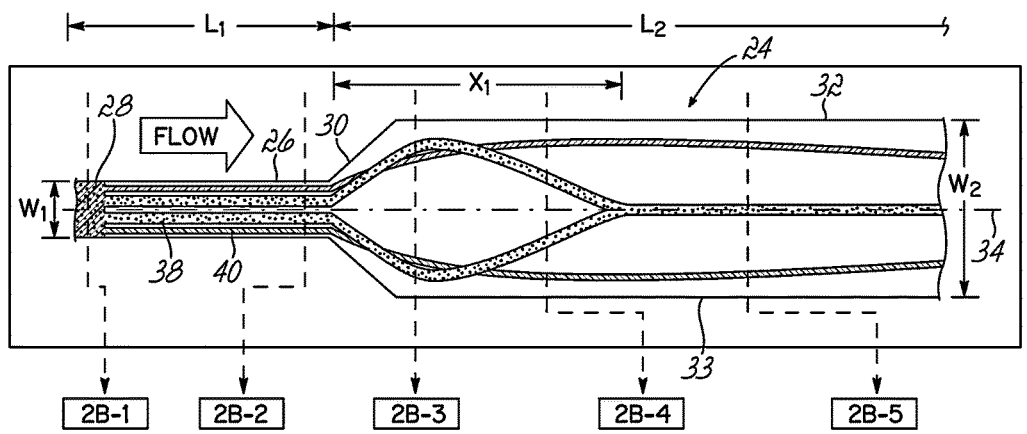
FIG. 2 is a top cross-sectional view of an alternative embodiment of a microfluidic device according to the present invention.
Figures 1, 2B:
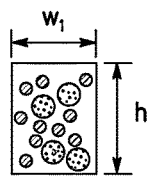
FIG. 1 is a view of a microchannel showing the migration of particles towards an equilibrium position.
Figures 2, 2B:
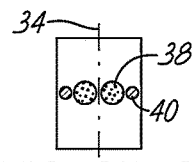

FIGS. 2B-1 to B-5 are cross-sectional views at certain points along the microfluidic device of FIG. 2.

Figures 2, 2B, 3:
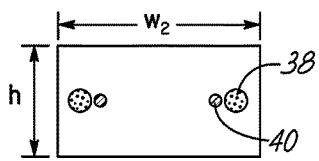
Figures 2, 2B, 3, 4:
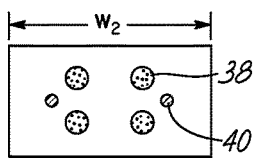
Figures 2, 2B, 3, 4, 5:
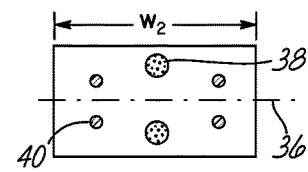
Figure 3:
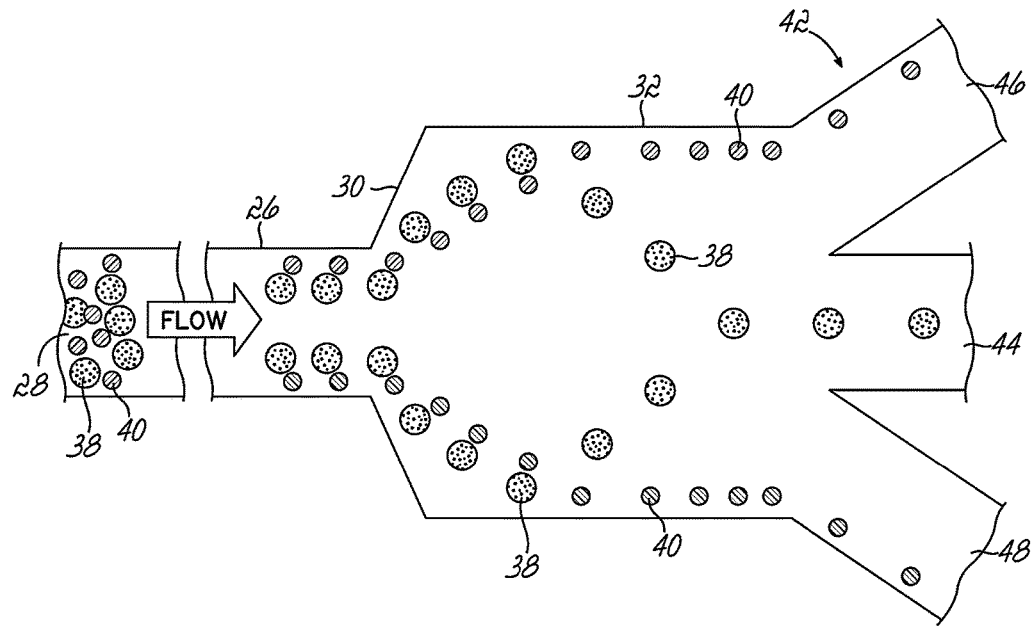
Figure 4:
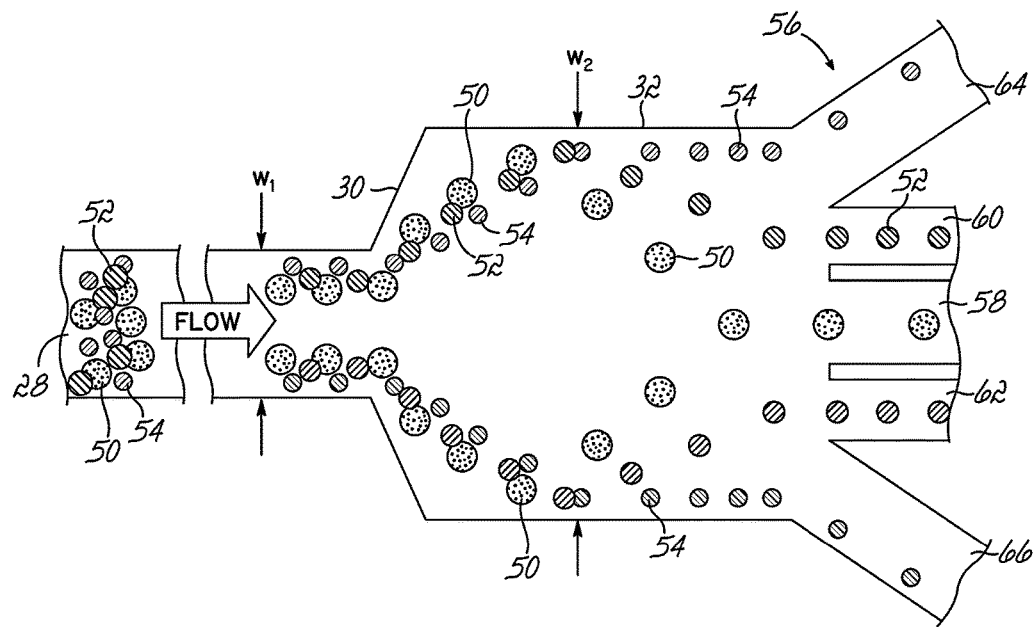
Figures 5A, 5B, 5C, 5D, 5E, 5F:
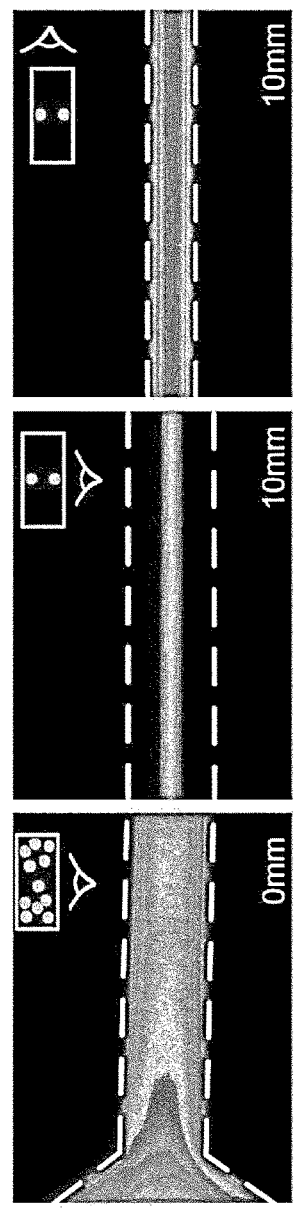

FIGS. 3 and 4 are top cross-sectional views of embodiments of the microfluidic device of FIG. 2A further including outlet systems for capturing particles or cells.

FIGS. 5A-F show experimentally measured results of focusing distances for specific particle diameters.

FIGS. 6A-D show the effect on various aspects of device functionality by altering flow and device characteristics.

Figure 7:
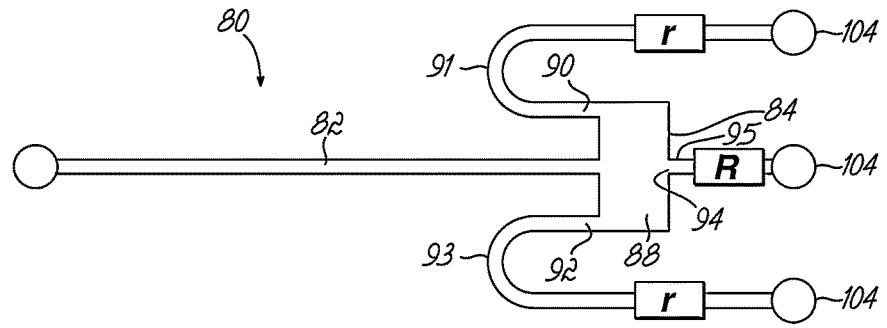

FIG. 7 shows a top view of an embodiment of a microfluidic device according to the present invention.

Figure 8:
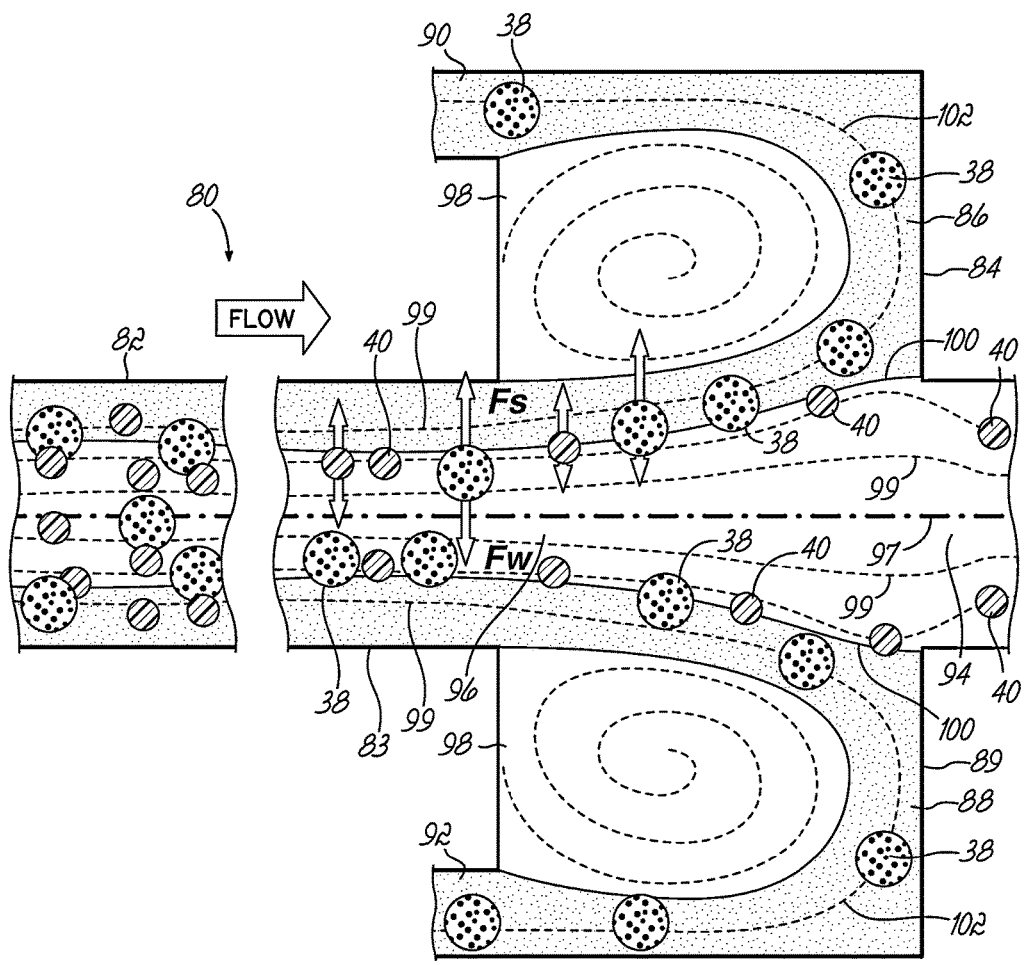

FIG. 8 shows a top cross-sectional view of the embodiment of a microfluidic device of FIG. 7.

Figure 9A:
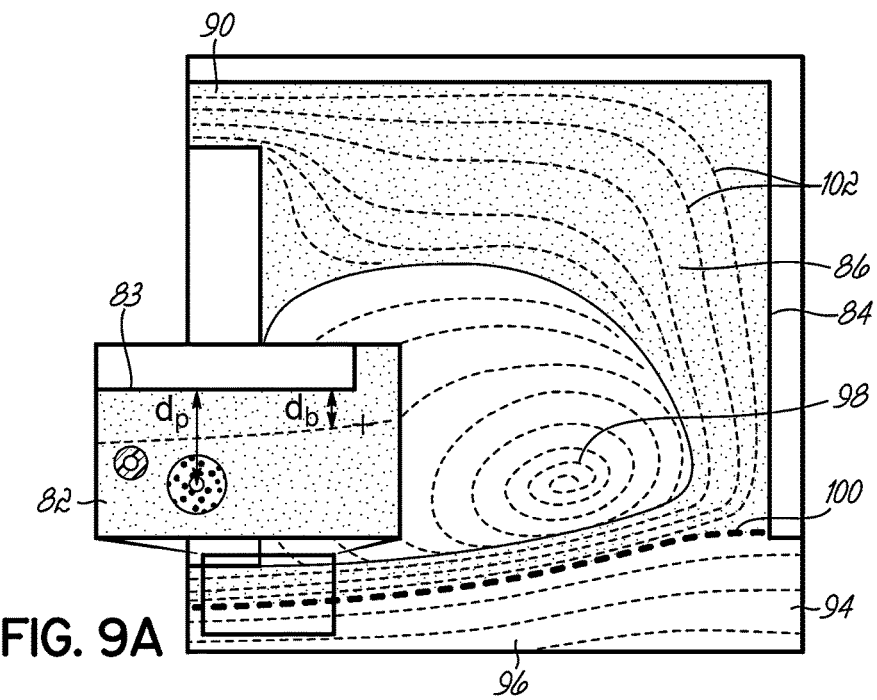

FIG. 9A shows a detailed view of top cross-section of the embodiment of a microfluidic device of FIG. 7.

FIGS. 9B-E show results of particle behavior by varying flow and/or particle characteristics.

Figure 10:
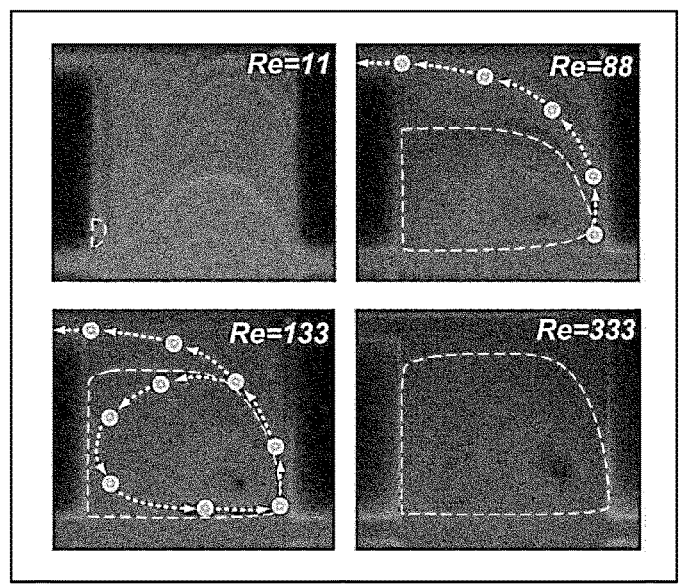

FIG. 10 shows the effect on particle behavior by varying flow characteristics.

Figure 11A:
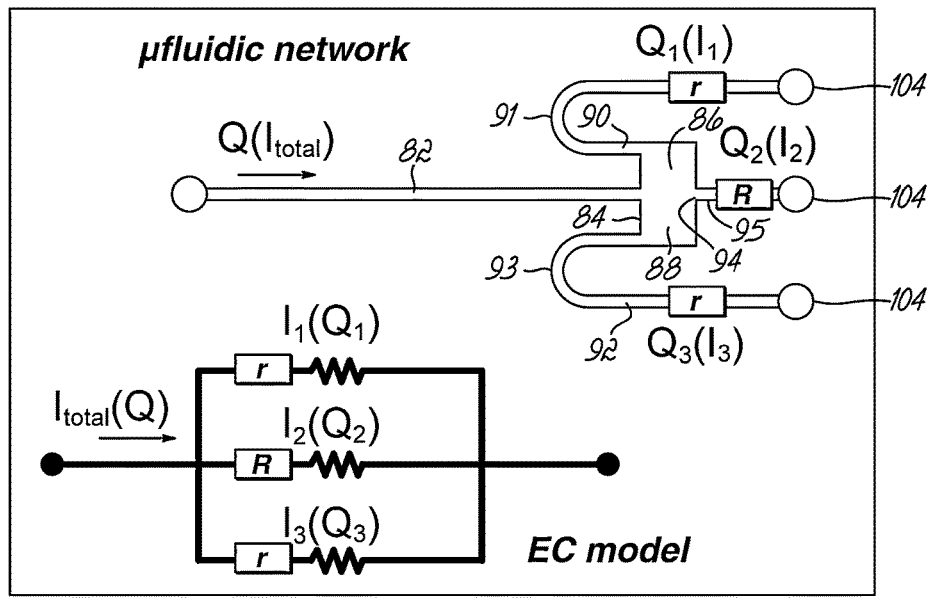

FIG. 11A shows the device of FIG. 7 and a corresponding electrical circuit model thereof.

Figure 11B:
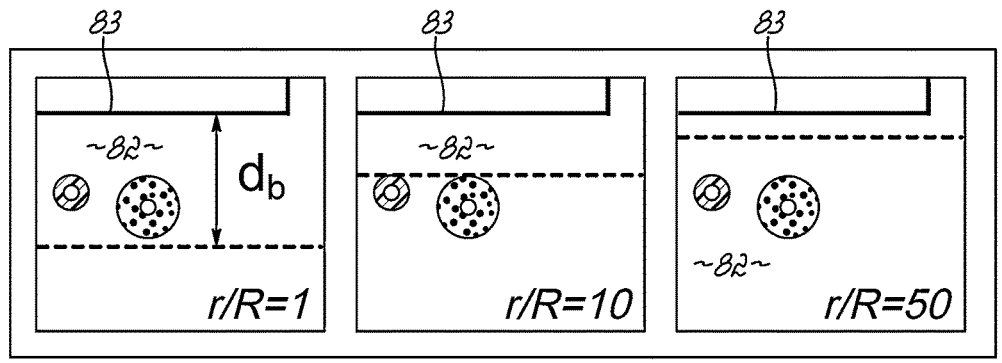
Figure 11C:
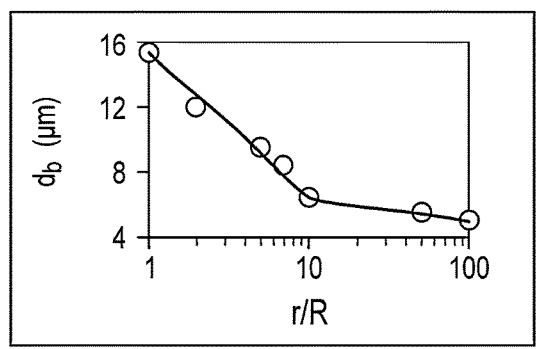

FIGS. 11B-C show the effect of altering flow characteristics on the boundary streamline of the device of FIG. 7.

FIGS. 11D to 11F-3 show the effect of altering flow characteristics on the size of a vortex of the device of FIG. 7.

DETAILED DESCRIPTION

In a preferred embodiment, as shown in FIG. 1, a low aspect ratio (AR) microchannel 2 focuses particles or cells 4 into a first equilibrium position upstream of other portions of the device. Aspect ratio is defined as the ratio of the between the height and the width dimensions $$\left(\frac{h}{w}\right).$$

A high aspect ratio channel, as described herein, has a height greater than the width, making the AR>1. In contrast, a low aspect ratio channel has a height less than the width, making the AR<1. Particles 4 are injected from the inlet (not shown) into the microchannel 2 where they distribute randomly. As a particle 4 travels downstream, shear lift force $F_s$ pushes it across a streamline 6 towards the wall. As the particle 4 approaches a wall 8, it experiences an increasing wall lift force $F_w$ acting to balance the shear lift (FIG. 1). Driven by these two dominant lift forces, the particles 4 eventually settle into an equilibrium position where $F_w$ balances $F_s$. The distance X necessary for particles of diameter a to focus and fully equilibrate can be described as $$X = \frac{3\pi\mu D_h^2}{4\rho U_f a^3}\left(\frac{w}{C_L^-} + \frac{h}{C_L^+}\right),$$

where $\mu$ is dynamic viscosity, $\rho$ is fluid density, $U_f$ is the average flow velocity, and $D_h$ is the hydraulic diameter ($D_h$=2wh/(w+h) for a channel w wide and h high). $C_L^-$ is the negative lift coefficient related to a first migration towards the side wall and $C_L^+$ is the positive lift coefficient related to a second migration towards the center of the side wall 8 achieving full focusing as two streams. The above equation illustrates a strong dependence of the focusing distance on particle diameter (X~$a^{-3}$). Thus, larger particles will require much less focusing length than the smaller ones. While the above equation describes the length necessary for particles of diameter to focus and fully equilibrate, this can also be thought in terms of aspect ratio. As will be discussed in more detail hereinbelow, the distance X depends on flow characteristics such as $U_f$, which is often characterized within the measurement of the Reynolds number (Re). By altering the Re between 1 and 330, it is possible to focus particles into an equilibrium position at a distance X within the microchannel 2, with aspect ratios of the microchannel being between 0.001 and 1.

Equilibrium positions, as shown in FIGS. 2B-2 and 2B-5 are defined as similarly sized particles 28 (shown in FIG. 2) forming a symmetrically disposed pair of single streams in a channel. The device in the present invention is capable of separating particles having a size difference of at least 1 µm. Particles with a size difference greater than or equal to 1 µm, for purposes of describing the present invention, are differently sized particles. Therefore, similarly sized particles, as described herein, refers to particles having a size difference of less than 1 µm. An axis about which the pair of single streams of particles are disposed depends upon whether the AR of the microchannel through which the particles are traveling is a low aspect ratio or high aspect ratio. Aspect ratio is defined as the ratio of the between the height and the width dimensions. A high aspect ratio channel, as described herein, has a height greater than the width, making the AR>1. In contrast, a low aspect ratio channel has a height less than the width, making the AR<1.

With reference to FIG. 2, for example, in the first microchannel 26 having a high aspect ratio, the axis 34 about which the symmetrically disposed streams of particles are disposed bisects the width dimension (FIG. 2B-2). On the other hand, in the low aspect ratio second microchannel 32, the axis 36 about which the symmetrically disposed streams of particles 28 are disposed is an imaginary line that bisects the height dimension. As shown in FIG. 2B-2, the proximity to the axis 34 in equilibrium depends on the size of the particles. More specifically, symmetrically disposed streams of larger first particles 38 will be closer to the axis 34 than the symmetrically disposed streams of smaller second particles 40.

Figure 1A:
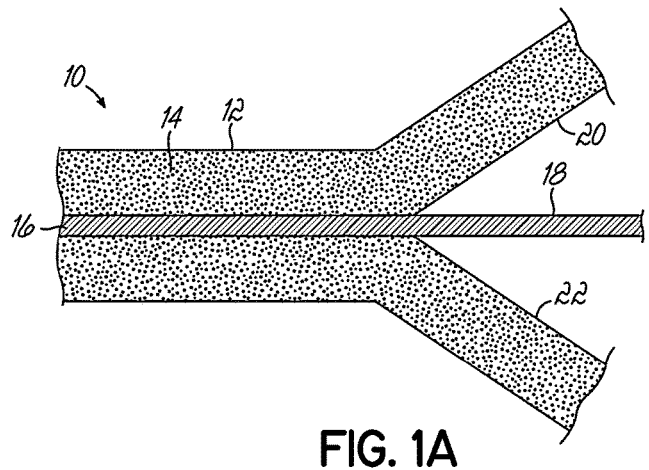
FIG. 1A is a top cross-sectional view of an embodiment of a microfluidic device according to the present invention.

In a preferred embodiment, as seen in FIG. 1A, a microfluidic device 10 for separating particles 14 includes a microchannel 12 configured to allow the particles 14 directed therein to focus into an equilibrium position in the microchannel 12. The device 10 further includes a first outlet 18 for capturing at least a first portion 16 of the particles 14 after the first portion 16 focuses into an equilibrium position in the microchannel 12, and a second outlet 20 for capturing a second portion of the particles 14 before the second portion focuses into an equilibrium position. The device 10 includes a third outlet 22 for capturing the second portion of the particles 14 before the second portion focuses into an equilibrium position. Particles 14 traveling in the microchannel 12 and not reaching or unable to reach an equilibrium position due to the characteristics of the particle 14 or the flow characteristics, as shown in the portions (on each side of the portion 16 of particles 14 shown in the equilibrium position), for example, exit out of the second and third outlets 20, 22.

In another preferred embodiment, the device 24 includes a first, upstream microchannel 26 having a first aspect ratio and a length $L_1$ in order to allow the particles 28 directed therein to focus into a first equilibrium position (shown in 2B-2), as described above, in the first microchannel 26. The device 24 further comprises a second, downstream microchannel 32 in fluid communication with the first microchannel 26. The second microchannel 32 has a second aspect ratio and a length $L_2$. Upon entering the second microchannel 32, the particles 28 exit the first equilibrium position and experience a first migration away (i.e., at point of FIG. 2B-3) from a center axis 34 of second microchannel 32 and towards walls 33 of the second microchannel 32, and a second migration towards a second equilibrium position (i.e., at point of FIG. 2B-5). The second migration to the second equilibrium position ends at distance X from a beginning of the second microchannel 32. The device 24 further comprises a plurality of outlets 42 (FIGS. 3 and 4) disposed before distance X and configured to capture at least a portion of the particles 28 during the second migration thereof, before at least a portion of the particles 28 reach the second equilibrium position in the second microchannel 32.

More specifically, with reference to FIG. 2, the device 24 comprises first and second microchannels 26, 32 with a transition portion 30 therebetween. The first, upstream microchannel 26 consists of a high aspect ratio channel where randomly dispersed particles 28 at the input move to an equilibrium position within the first microchannel 26 at a distance X, which depends, in part, on the diameters a of the particles 28. The particles 28 then enter the second, downstream microchannel 32 having a lower aspect ratio and, because the equilibrium position of the particles 28 depends in part on the AR, the equilibrium positions of the particles 28 change upon entering the second microchannel 32.

In a preferred embodiment, with reference to FIG. 2, the particles 28 further include first and second particles 38, 40 having first and second diameters $a_1$, $a_2$. $a_1$ is greater than $a_2$. As the particles 28 exit the first microchannel 26 and enter the second microchannel 32, as discussed above, the aspect ratio changes, thus changing the equilibrium positions. This change in equilibrium positions causes particles 28 to regain migration velocity in order to move toward the second equilibrium position. The particles 28 experience a first migration away from a center axis 34 of the second microchannel 32. Thereafter, the particles 28 experience a second migration towards the second equilibrium position and eventually reach the second equilibrium position. Since the migration velocity $U_m$ is strongly dependent on particle diameter a, the relationship therebetween represented as $U_m \propto a^3$, the first particles 38 complete their migration much faster than the second particles 40. Thus, the first particles require much shorter downstream channel length $L_2$ (because X is shorter for the first particles), which scales inversely with the particle diameter as $L \propto a^{-2}$.

Consequently, in the downstream, second microchannel 32, the slowly migrating second particles 40 remain near channel sidewalls while the first particles 38 reach the second equilibrium position at distance $X_1$ near centers of the top and bottom walls 33. Placing an outlet system 42 at channel end (FIG. 3) then permits a complete separation based on size alone, with the first particles 38 exiting from the center outlet 44 and the second particles 40 exiting from the side outlets 46, 48. In alternative embodiments, the device 24 is configured to separate more than two sizes of particles 28. As the number of sizes of particles 28 increases, the number of outlets for capturing particles may also need to increase depending on the desired characteristics and final result of separation. For example, if three different sizes of particles 28 are desired to be separated, then five outlets may be required if it is desired to filter each size of particles into separate outlets, as shown in FIG. 4. The relationship between the number $N_p$ sizes of particles and the number of outlets 42 (FIG. 3), 56 (FIG. 4) in the embodiments shown in FIGS. 3 and 4 is $N_o = 2N_p - 1$.

As described above, the outlets 42 (FIG. 3), 56 (FIG. 4) may be placed before a focusing distance X. Where there are multiple sizes of particles—first, second and third particles 50, 52 and 54 having focusing distances $X_1$, $X_2$ and $X_3$, respectively, for example (FIG. 4)—the outlets may be placed at any point after, among or between $X_1$, $X_2$ and $X_3$, depending on which particles are desired to be separated. For example, if $X_3$ is greater than $X_2$ and $X_1$, the outlets may be placed after $X_2$ such that the first and second particles 50, 52 enter a center outlet 58 and the third particles 54 enter side outlets 60, 62, 64, 66. On the other hand, as seen in FIG. 4, the outlets 58, 60, 62, 64, 66 may be placed between $X_1$ and $X_2$ such that the first, largest particles exit from a center outlet 58, and the second and third particles 52 and 54 exit from side outlets 60, 62 and 64, 66, respectively. The configuration of the outlets 42 (FIG. 3), 56 (FIG. 4) and placement thereof will depend on which particles or cells are desired to be separated and filtered.

It may be advantageous to provide receptacles 104 (FIG. 7) fluidically communicating with the outlets in order to capture the particles 28 exiting from the outlets. Moreover, different outlets 42 (FIG. 3), 56 (FIG. 4) from which similarly sized particles 28 are exiting may be fluidically communicated with the same receptacle, thus enabling the deposit of similarly sized particles 28 into the same receptacle.

The total length of the system ($L_t$) is the sum of the upstream/first microchannel length ($L_1$) and the downstream, second microchannel length ($L_2$). As it is necessary to focus every particle 28 into equilibrium positions before the aspect ratio reversal as the particles 28 leave the first microchannel 26 and enter the second microchannel 32, $L_1$ is dictated by the lateral velocity of the slowly-migrating second particles 40. Conversely, migration of the first particles 38 dictates the $L_2$ as they require a shorter focusing length. To calculate length of each segment, lateral migration velocity $U_m$ has to be known. For a particle in a flow with average velocity $U_f$ in a microchannel with hydraulic diameter $D_h$ ($D_h=2WH/(W+H)$), the lateral migration velocity is expressed as $$U_m = \frac{4\rho C_L U_f^2 a^3}{3\pi\mu D_h^2}$$

where $\rho$ is the fluid density, $\mu$ is the dynamic viscosity of fluid and $C_L$ is the lift coefficient. Hence, the distance X necessary for complete focusing can be calculated by accounting of the maximum flow velocity $U_{max}=2U_f$ and the particle migration distance $d_m$ as $X=U_{max}d_m/U_m$. By designating $d_m^-$ as the first stage migration distance with lift coefficient of $C_L^-$ and $d_m^+$ as the second stage migration with lift coefficient of $C_L^+$, the focusing distance X can be calculated as $$X = \frac{3\pi\mu D_h^2}{2\rho U_f a^3}\left(\frac{d_m^-}{C_L^-} + \frac{d_m^+}{C_L^+}\right)$$

For example, in the first microchannel 26, $d_m^-=\frac{1}{2}W_1$ and $d_m^+=\frac{1}{2}H$. Similarly, in the second microchannel 32, $d_m^-=\frac{1}{2}H$ and $d_m^+=\frac{1}{2}W_2$. Using the above equation, particles of diameter 10 μm and 20 μm were separated by way of example. The upstream first microchannel 26 has the dimensions of 27 μm ($W_1$)×50 μm (H). The downstream, second microchannel 32 includes dimensions of 100 μm ($W_2$)×50 μm (H). In this embodiment, the aspect ratios of the first and second microchannels 26, 32 are 1.85 and 0.5, respectively. However, depending on the flow characteristics such as Re and the particle diameter a, aspect ratio of the high AR first microchannel 26 may be anywhere from 1000 to 1, while the aspect ratio of the low AR second microchannel 32 may be anywhere from 0.001 to 1. Lift coefficients are experimentally determined and depend upon particle size and flow characteristics, namely Re.

The manner of determining lift coefficients is as follows. For particles (or cells) flowing in a microchannel, the sign of the lift coefficient due to the balance of the shear-induced and wall-induced lift forces ($F_s$ and $F_w$) is negative, as particles migrate away the channel centerline and orthogonal to the channel wall 33. Conversely, the lift coefficient due to rotational lift is positive, which implies lift up the velocity profile and parallel to channel wall 33. Herein, the two coefficients are denoted as $C_L^-$ and $C_L^+$. The distance X required to focus particles can be written as $$X = \frac{U_m d_m}{U_L} = \frac{3\pi\mu D_h^2 d_m}{2\rho U_f C_L a^3}$$

where $U_m$ is the maximum flow velocity ($U_m=2U_f$) and $d_m$ is the particle migration distance. Thus, the lift coefficient is given as $$C_L = \frac{3\pi\mu D_h^2}{2\rho U_f a^3} \times \frac{d_m}{X}$$

Therefore, as long as the particle migration distance $d_m$ and the focusing length X are known, the lift coefficient can be obtained.

To do this experimentally, microchannels with rectangular cross-section can be used. In a low aspect ratio channel, randomly-distributed particles will first rapidly migrate and equilibrate near the top and bottom walls, and thus the migration distance is half of the channel height length ($d_m^-=H/2$). This initial stage focusing can be observed experimentally using a high aspect ratio channel (essentially rotating channel by 90°). Subsequently and further downstream in this low aspect ratio channel, particles migrate toward the center of the top and bottom walls and the migration distance is approximately half of the width ($d_m^+=W/2$). The stage of focusing in low aspect ratio channels can be observed directly with a microscope. The same approach can be extended to high aspect ratio channels, by appropriately switching the H and W.

Figure 6A:
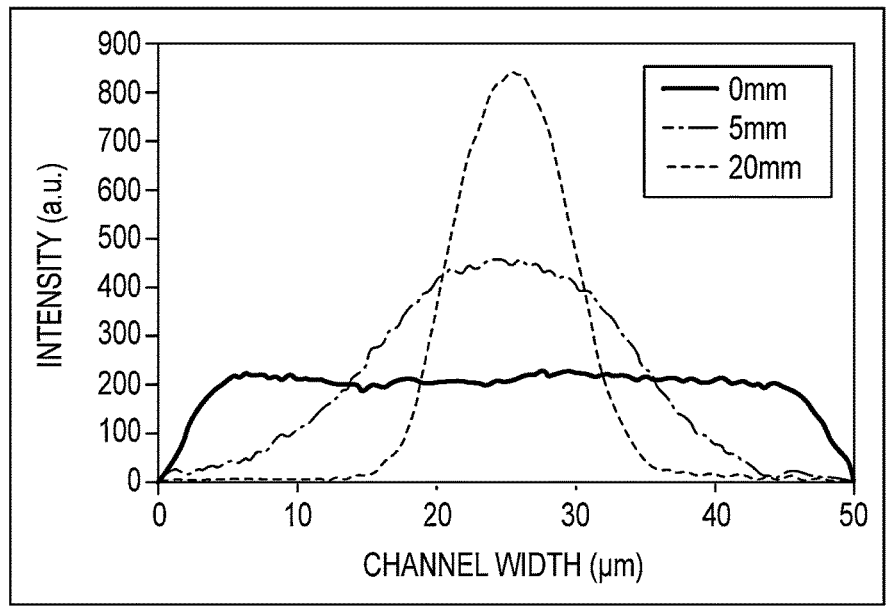

To determine the focusing length, fluorescent intensity is measured across channel at successive downstream positions. Progressive entrainment of particles as they flow downstream is shown in FIG. 6A. Quality of particle focusing can be judged by measuring full width at half maximum (FWHM) of these intensity peaks. Progressive reduction in the FWHM indicates progressively tighter focusing. The downstream position where migration toward the channel wall stops and FWHM value stabilizes is the focusing length. If side streams are present, full width at tenth of maximum (FWTM) can be used instead to quantify the fluorescent line scans. As with FWHM, the reduction in FWTM indicates increasingly tighter focusing of particles. Once peak width stops decreasing and becomes constant, particle migration is complete and the downstream position at which this occurs is the focusing length.

Using the respective lift coefficients for the exemplary 10 and 20 μm diameter particles which were obtained using the above method, the focusing distances $X_1$ and $X_2$ for the particles to reach the equilibrium positions can be determined. Specifically, $X_1$=10.3 mm for the 10 μm diameter particles in a 27 μm×50 μm channel ($C_L^-$=0.12 and $C_L^+$=0.013 at Re=40). Similarly, $X_2$=9.2 mm for the 20 μm diameter in a 100 μm×50 μm channel ($C_L^-$=0.3 and $C_L^+$=0.05 at Re=20). These can be confirmed by calculations or experimentally by measuring the fluorescent intensity distribution progressively in the microchannel as various downstream positions (FIGS. 5A-E).

Figure 6B:
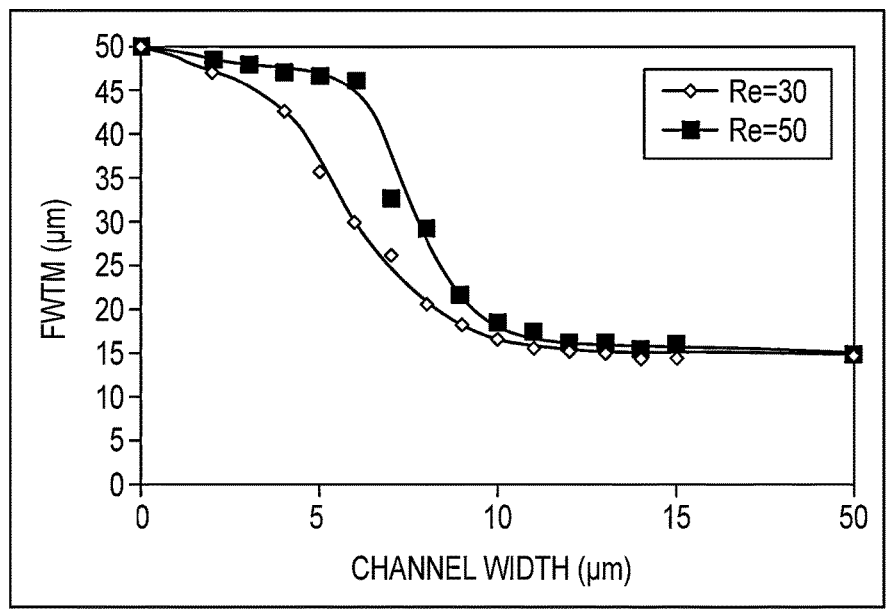
Figure 6C:
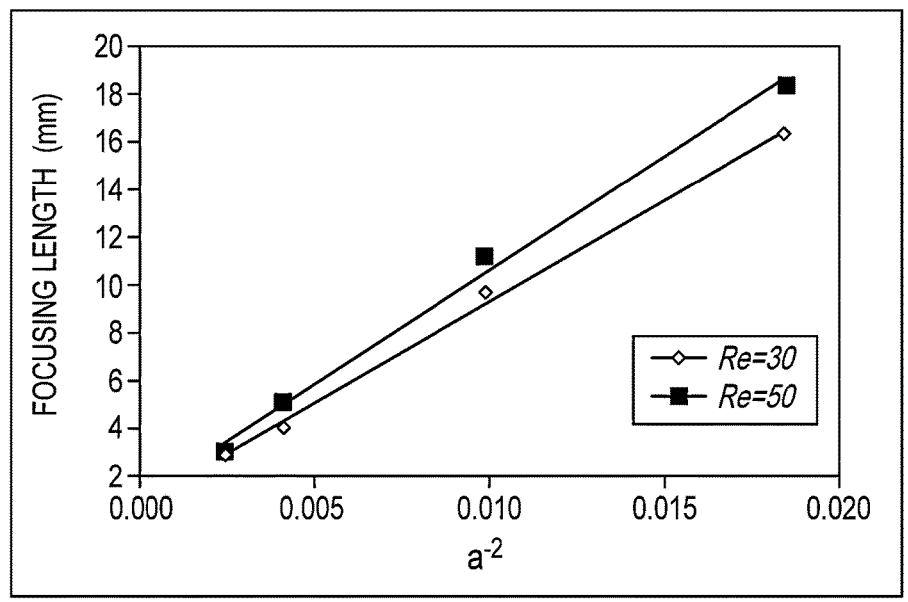

Because flow rate affects the focusing distance X (the distance required for the particles to reach the equilibrium position), the flow rate, or the Reynolds number (Re, which depends upon the flow rate), must be optimized. Different flow conditions were observed in order to determine an optimal Re where X is minimized (FIGS. 6A-D). Line scans of fluorescent images at downstream positions disclose the progressive increase of intensity of the central peak, indicating particle migration to the equilibrium positions (FIG. 6A). Full width at half maximum (FWTM) was used to characterize the focusing length where FWTM becomes constant, as shown in FIG. 6B.

Focusing distance X scales with $a^{-2}$ (FIG. 6C), due to the observation that $C_L^+ \propto a_p^{-2}$ and $$\frac{d_m^-}{C_L^-} << \frac{d_m^+}{C_L^+}.$$

Figure 6D:
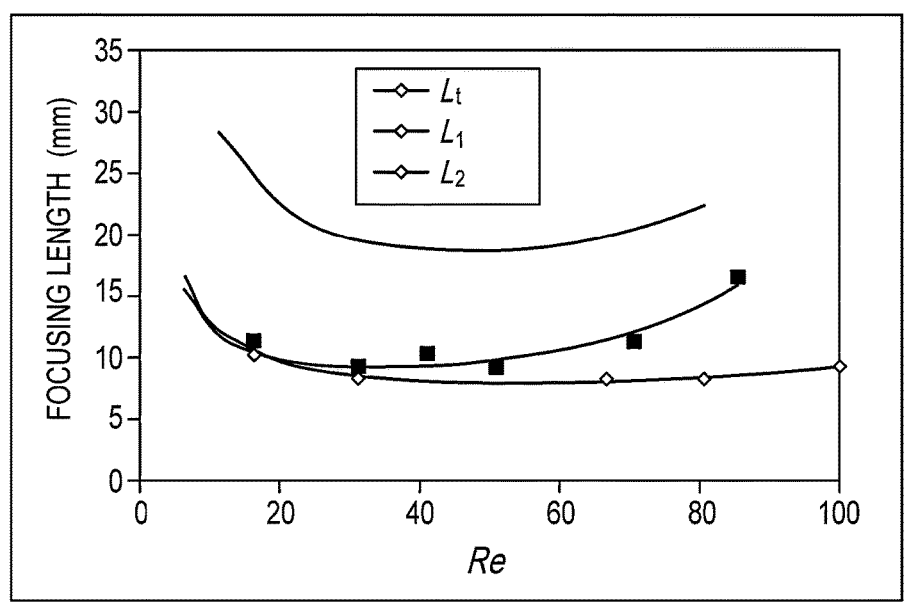

Optimal flow conditions are determined by plotting the focusing lengths $X_1$ and $X_2$ as a function of Re (FIG. 6D). Since Re in the second microchannel is half of the input Re in the first microchannel, the total focusing length $X_t(Re)=X_1(Re)+X_2(\frac{1}{2}Re)$. The data reveal the optimal flow conditions at Re=40, with the total focusing length of $X_t$=19 mm ($X_1$=10 mm and $X_2$=9 mm); any change in either direction leads to an increase in focusing length. In other embodiments where the size of the microchannels 26, 32 is different, the equation, which is ultimately dependent on Re, would be different. Based on the equation provided above, the equation for calculating other focusing lengths in microchannels 26, 32 having different dimensions can be acquired. It is from this focusing length of particles 28 that would enable the design and location of the placement of outlets 42 (FIG. 3), 56 (FIG. 4) for capturing particles and/or cells 28.

In another embodiment, as shown in FIG. 7, the device 80 includes a microchannel 82 having a first aspect ratio and a length $L_1$ in order to allow the particles 28 directed therein to focus into a first equilibrium position in the microchannel 82. The length of the microchannel 82 required to focus the particles 28 into the first equilibrium position is described hereinabove with respect to the prior embodiments. The device 80 further includes a chamber 84 fluidicly communicating with the microchannel 82 and having a second aspect ratio. The chamber 82 further includes symmetric, first and second capture portions 86, 88, each capture portion 86, 88 communicating with first and second chamber outlets 90, 92, respectively. The chamber 84 communicates with a main outlet 94, thereby defining a main flow area 96 in the chamber 84 between the microchannel 82 and main outlet 94, the main flow area 96 also defined as being between the first and second capture portions 86, 88. With first and second particles 38, 40 of different sizes, the first particles 38 larger than the second particles 40, upon entering the chamber 84, the equilibrium position of the particles 38, 40 changes and the symmetrically disposed streams of particles 38, 40 experience a first migration away from a center axis 97 of the chamber. The distance of first migration depends on particle size. Generally, if the first migration causes the particles 38, 40 to leave the main flow area 96, the particles 38, 40 would enter the capture portions 86, 88. In the embodiment shown in FIG. 7, the first particles 38 migrate out of the main flow area and into the capture portions 86, 88. On the other hand, second particles 40 remain in the main flow area 96 during the first migration, whereby the particles 40 further experience a second migration towards the equilibrium position and exit from main outlet 94.

The microchannel 82, in one embodiment, includes a 10 mm length, 50 μm width, and 100 μm height. The chamber 84 has a 500 μm width and a 500 μm height. The length of the microchannel 82 in this embodiment is calculated from the equation above using the attributes resulting from the dimensions chosen for the width and height of the chamber 84, which ultimately affects, for example, the flow rate. The length of chamber outlet channels 91, 93 can be varied in order to modulate fluidic resistance ratio (r/R) of the chamber outlets 90, 92 (r) and main outlet 94 (R), which affects the migration of particles 28 into the capture portions 86, 88, as discussed in more detail herein below. As discussed below, there are ranges of r/R and Re which will provide for effective separation of particles or cells, depending on the flow characteristics (Re) and the size of the particles or cells involved.

More specifically, as shown in FIG. 8, the first and second capture portions 86, 88 include microscale laminar fluid vortices 98, also known as Moffatt eddies, which form in the capture portions 86, 88 in a manner known to persons skilled in the art. The vortices 98 are operative to entrain particles 28 migrating thereinto for size-selective filtering. As shown in FIG. 8, as particles 38, 40 approach the end of the microchannel, they begin to migrate toward one of the vortices 98 under the influence of the shear-induced lift force $F_s$, which is no longer balanced by the wall lift due to absence of the channel sidewalls. Once the particles 38, 40 enter the chamber 84, which has a second aspect ratio, which is lower than the first aspect ratio of the microchannel, the particles 38, 40 exit the first equilibrium position. When the particles 38, 40 are not in an equilibrium position, particle migration is dominated by the shear-induced lift force $F_s$, which depends on particle diameter a. Specifically, the relationship between particle diameter a and shear-induced lift force is represented as $F_s \propto a^2$. Assuming that the shear lift is balanced by the Stokes drag ($F_D=3\pi\mu aU_L$, μ is the fluid viscosity), the relationship between lateral migration velocity of the particles and the diameter of the particles 38, 40 is represented as $U_L \propto a$.

More specifically with respect to the vortices 98, particles are moved across the streamlines 99. The boundary streamline 100 determining the capture of the particles 28 into the capture portions 86, 88 is represented as a dashed line in FIG. 8 and represents the boundary between the main flow area 96 and the capture portions 86, 88. Once particles 38 migrate across the streamline, they become captured and exit from the chamber outlets 90, 92. It is this size-sensitive capture feature that leads to the possibility of selective separation, as particles below a threshold diameter (for example, second particles 40), depending on the dimensions and flow characteristics of the device 80, do not migrate across the boundary streamline 100 and thus, remain in the main flow area 96 and exit from the main outlet 94.

While the capture portions 86, 88 traps the particles 28 (specifically first particles 38 in the embodiment shown in FIG. 8), the chamber outlets 90, 92 provide for continuous release of particles 28. With ideal flow characteristics, such as selecting r/R and Re for efficient separation and high throughput (discussed hereinbelow), flow into the chamber outlets 90, 92 leads to flow separation, creating a sheath flow 102 that wraps around the vortex 98, as shown in FIG. 8. The sheath flow region 102 causes the vortex 98 to shrink in size, below the stable trapping orbits of particles. This leads to distinct particle behavior—instead of getting trapped, particles 28 release through the chamber outlets 90, 92 following the sheath flow 102. The sheath flow 102 is advantageous because absent the sheath flow 102, more particles 28 may become trapped in the vortices 98, thus lowering the effectiveness of separation and reducing the efficiency. The sheath flow 102 in each capture portion 86, 88 is made possible by including the first and second chamber outlets 90, 92 in the first and second capture portions 86, 88, respectively.

It may be advantageous to provide receptacles 104 (FIG. 11A) fluidically communicating with the outlets 90, 92, 94 in order to capture the particles 28 exiting from the outlets 90, 92, 94. Moreover, different outlets from which similarly sized particles are exiting may be fluidically communicated with the same receptacle, thus enabling the deposit of similarly sized particles 28 into the same receptacle. For example, because in one embodiment the first particles 38 exit from each of the chamber outlets 90, 92, it may be advantageous to fluidically communicate the chamber outlets 90, 92 with a common receptacle (not shown).

In one embodiment, the first and second fluid vortices 98 each comprise a pair of vertically oriented fluid sub-vortices (not shown). In that embodiment, the sub-vortices capture and direct particles 28 to the chamber outlets 90, 92 in the same manner as one vortex 98 in the capture portions 86, 88. In the embodiment with the vertically oriented sub-vortices, however, a portion of the particles is captured by an upper sub-vortex and another portion of the particles is captured by a lower sub-vortex, the sub-vortex which captures a particular portion depending on the vertical position of the particles in the chamber.

To maximize separation selectivity and efficiency, different characteristics of the device must be optimized. The flow rate, for example, must be optimized in order to provide for greater separation accuracy and efficiency. For particle capture, flow rate influences the streamline distribution and the magnitude of inertial force leading to different particle behavior. Flow rate, in this application, is discussed in terms of the Reynolds number of a fluid, because those skilled in the art very often describe the characteristics of fluid using the Reynolds number (Re). Because flow rate is directly proportional to the Reynolds number of a fluid, (where $$Re = \frac{QD_H}{\nu A},$$

where $\nu$ is a kinematic viscosity, Q is flow rate, and $D_H$ is the hydraulic diameter of the pipe, $$D_H = \frac{4A}{P}$$

in a rectangular channel, where A is the cross-sectional area and P is the wetted perimeter), adjusting the flow rate adjusts the Reynolds number. The distance that particles migrate ($d_m$) after exiting the microchannel 82 and enter the chamber 84, thus leaving the first equilibrium position, is dependent upon the flow rate, and thus the Reynolds number of the fluid medium of the particles 28. Moreover, the position of the boundary streamline, $d_b$, which is the boundary between the capture portions 86, 88 and main flow area 96, depends on the flow rate, and thus the Reynolds number.

Figure 9B:
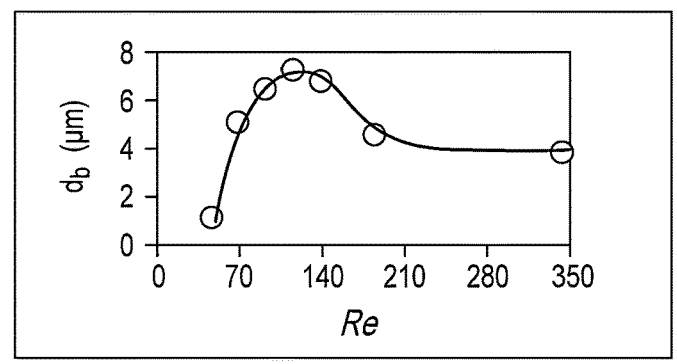
Figure 9C:
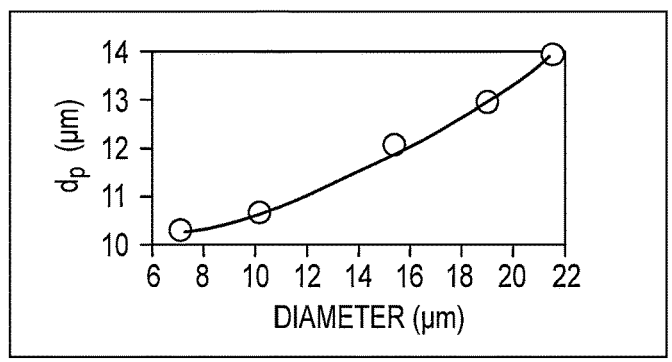

By way of example, as shown in FIG. 9A-E, models for r/R=10 illustrate that the boundary position $d_b$ increases with Re from $d_b$=1.0 μm (Re=44), peaking at $d_b$=7.3 μm at Re=110 and settling at $d_b$=3.8 μm for Re>200 (FIG. 9B). To calculate the particle migration distance $d_m$ to the boundary, it is necessary to calculate the particle focusing position $d_p$ (FIG. 9C). Then, migration distance $d_m$ is calculated to be $d_m=d_p-d_b$. For a 21 μm diameter particle, the minimum migration distance is $d_m$=6.6 μm at Re=110, which is the optimal Re for shortest migration distance causing capture.

The shear lift force on particles 28 also depends on the flow rate. Specifically, higher flow velocity leads to larger shear lift force on particles, where the relationship between shear lift and flow rate is represented by $F_s \propto U_f^2$. Based on Stoke's law, the lateral migration velocity $U_L$ is related to flow rate, the relationship being represented as $U_L \propto U_f^2$. This relationship indicates that particles migrate faster toward the capture portions, and thus the vortices, at higher Re, and thus a higher flow rate. Therefore, the flow rate influences the migration distance $d_m$ for particle capture, as well as the migration velocity of particles, which ultimately affects the efficiency, accuracy and throughput of the device.

Figure 9D:
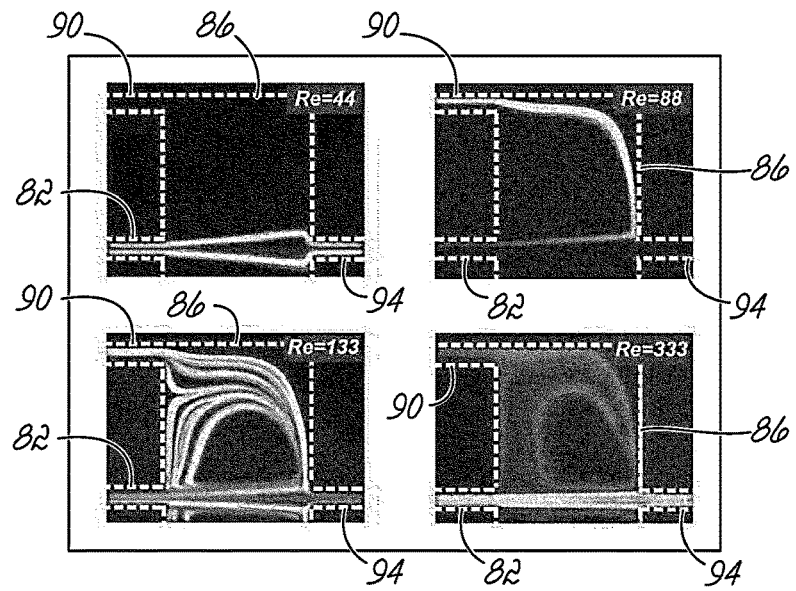
Figure 9E:
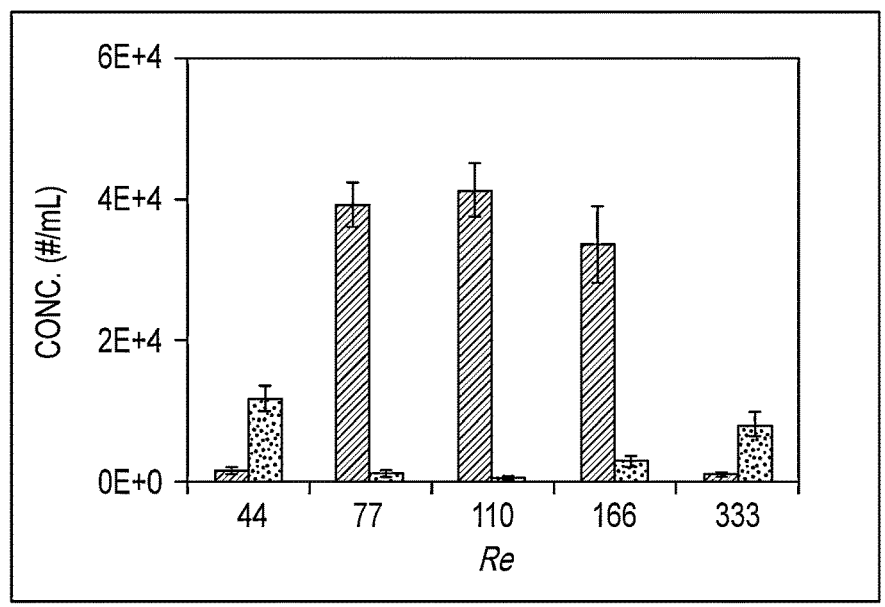

FIG. 9D shows an example demonstrating the behavior of 23 μm diameter particle at various Re. At Re=44, for example, transverse migration is not sufficient for particles to migrate from the main flow area 96 into the capture portions 86, 88. At Re=88, the boundary streamline 100 shifts closer to the particle focusing position and particles 28 migrate faster driven by larger shear force, causing them to migrate into the capture portions 86, 88 and exit from the first and second chamber outlets 90, 92. At Re=330, the boundary streamline 100 shifts toward the wall 89 of capture portion such that the particles 28 must migrate a further distance in order to migrate into the capture portions 86, 88. Moreover, as the Re, and thus the flow rate, increases, the particles 28 migrate more quickly towards the capture portions 86, 88, thus increasing the throughput of the device 80. However, increasing the flow rate increases the shear induced force on the particles 28, which decreases the amount of particles 38 migrating into the capture portions 86, 88. Thus, the flow rate must be optimized in order to allow for a fast throughput as well as a high separation or extraction efficiency by allowing for larger particles to migrate into the capture portions. A hemocytometer is used to measure the concentration of particles exiting from the chamber outlets 90, 92 and main outlet 94. From these measurements, the corresponding extraction efficiency at various Re can be calculated. In this example, Re=110 shows the highest extraction efficiency (FIG. 9E). However, this ideal extraction efficiency was calculated using specific sizes of particles 28 and specific device 80 dimensions. Altering the particle or cell size or the size of the device 80 would ultimately change which Re shows the highest extraction efficiency. The range of Re to provide such a high extraction efficiency spans from about 1 to about 330.

Flow rate also affects the size of the vortices 98, which ultimately affects the amount of particles 28 (which migrate into the capture portions 86, 88) exiting the chamber outlets 90, 92. Specifically, as Re increases, the size of the vortices 98 increases, thus decreasing the extraction and separation efficiency of the device 80. FIG. 10 demonstrates the results of a model where Re (and thus flow rate) was changed to observe the corresponding change in size and geometry of the vortices 98. Using a device with r/R=10, vortex dimension experiences an increase of two orders of magnitude as the Re increases from 0 to 88 (growing stage), thus occupying 50% of the capture portion 86 at Re=88. The other 50% area is occupied by the vortex sheath region. Thus, as the particles 28 enter the chamber 84, as shown in FIG. 9D, the particles enter the capture portions 86, 88 and travel to the chamber outlets 90, 92 following the sheath flow 102 (for example, FIG. 9D). As Re increases from 133 to 333, the vortex area increases from 60% of the capture portion to 70% (stable stage) leaving around 30% of the capture portions 86, 88 as sheath region. As the area of the vortex 98 increases, the amount of particles 28 experiencing recirculation in the vortex 98 increases. Because many of the particles recirculating in the vortex 98 are not able to exit its respective chamber outlet 90, 92 and are essentially trapped in the vortex 98, extraction and separation efficiency is decreased. By way of example, for a device having r/R=10, the continuous release without observation of any recirculation could be achieved at Re<130. Again, however, this ideal flow rate (and thus Re) was determined using specific sizes of particles 28 and specific device dimensions and flow characteristics. This example is presented merely to show the functionality of the device 80 and method in exemplary fashion, and the specific numbers, dimensions of particles and the device 80, and flow characteristics thereof are not meant to be limiting. Altering the particle or cell size, the size or dimensions of the device 80, or the flow characteristics would ultimately change which Re, which must be changed properly to result in a size of vortex 98 conducive to a high extraction and separation efficiency.

Moreover, the ratio of the fluidic resistance r of the chamber outlets 90, 92 and the fluidic resistance R of the main outlet 94 (as represented by "r/R") must be optimized. For example, r/R can be altered by increasing the length of the channels 91, 93 and 95 connected to the chamber outlets 90, 92 and the main outlet 94, respectively. Moreover, the r/R can be altered by adjusting the cross-sectional areas of the outlets 90, 92, 94 and the channels 91, 93, 95. Adjusting r/R affects the flow rate which, in turn, affects the first and second vortices 98 in the capture portions 86, 88. The relationship between flow rate and r/R can be represented by the electric circuit model of paralleling resistors (FIG. 11A). Models, as shown in FIG. 11A, for 1≤r/R≤50 (intact chamber) at Re=88 were run to demonstrate the influence of resistance network on the boundary streamline 100 and the size of the vortices 98. From the simulation, the boundary streamline 100 which is the boundary between the capture portions 86, 88 and main flow area 96, was measured to be 15.3 μm away from the microchannel wall 83 as r/R=1 (FIG. 11B-C). Thus all the particles 28 are directly located in the sheath region and exit from the side-outlet matching the experimental observation at r/R=1 (FIG. 11F-1).

Figure 11D:
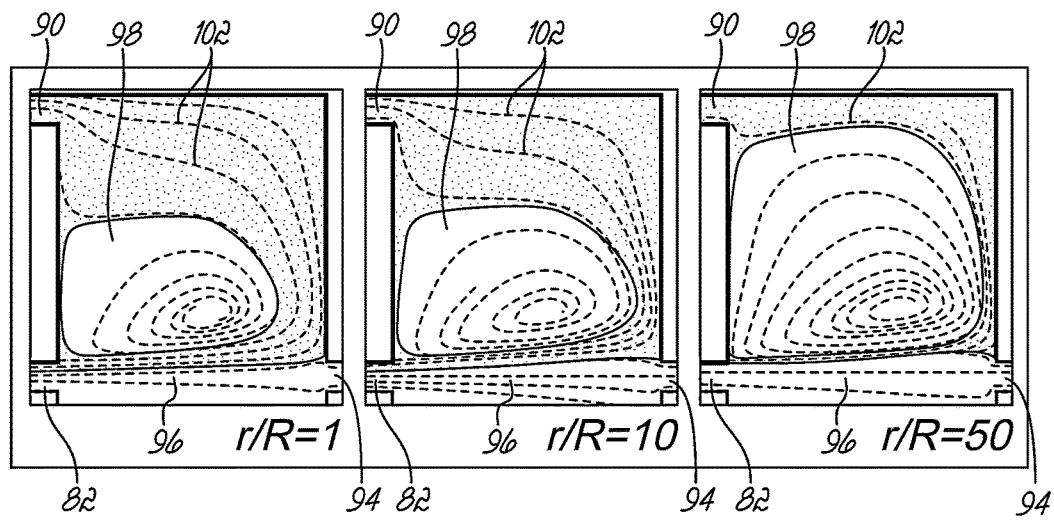
Figure 11E:
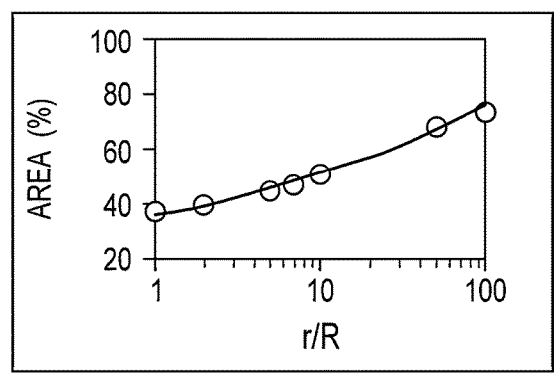
Figures 1, 11F:
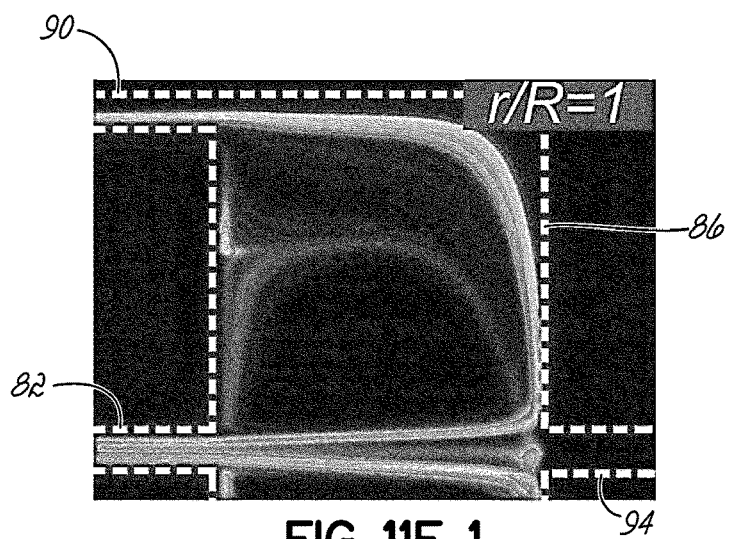
Figures 2, 11F:
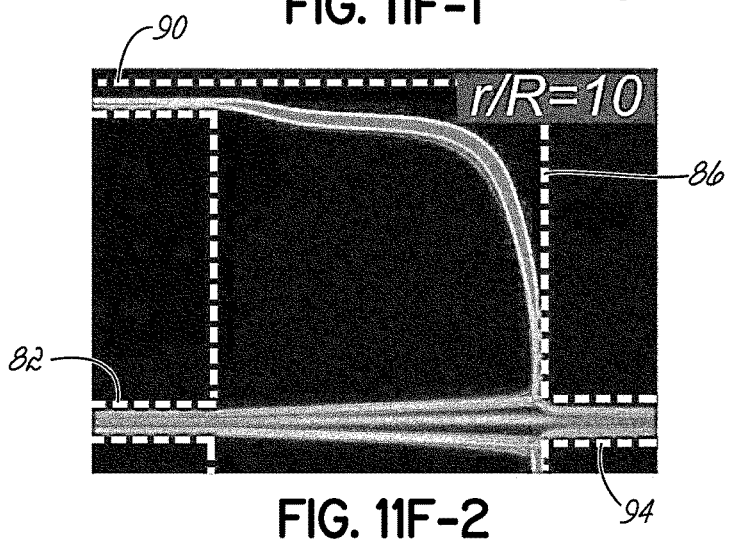
Figures 3, 11F:
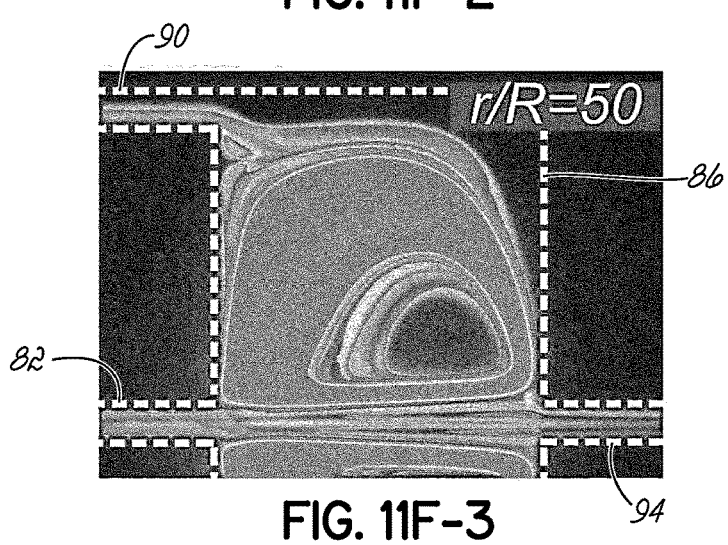

As the ratio increases to r/R=10, the boundary streamline 100 shifts fast to 6.4 μm away from the microchannel wall 83 (FIG. 11F-2). Further increase to r/R=50 shifts $d_b$ to around 5 μm. In these situations, particles 28 initially remain in main flow area 96. Thus inertial shear lift is required to push the particles 28 into sheath region for extraction from the side-outlet. In the example, the inertial shear lift is sufficient to push 23 μm diameter particles into sheath region while 15 μm diameter particles experience smaller shear lift and remain in main flow area 96 fulfilling size-based separation. Again, however, this ideal r/R was calculated using specific sizes of particles and specific device dimensions and flow characteristics. This example is presented merely to show the functionality of the device 80 and method in exemplary fashion, and the specific numbers, dimensions of particles or cells 28 and the device, and flow characteristics are not meant to be limiting. Altering the particle or cell size, the size of the device 80, or the flow characteristics would ultimately change r/R, which must be optimized properly to result in a size of vortex 98 conducive to a high extraction and separation efficiency.

The resistance network influences vortex dimension by tuning the flow rate in the side outlet, thus affecting the amount of particles exiting from the first and second chamber outlets 90, 92 and thus the main outlet 94. The example shows the increase of size of the vortices 98 as r/R increases between 1 and 100 (FIGS. 11D-E). The vortex dimensions at various r/R are measured from both simulation and experiment (FIG. 11E). At r/R=1, the vortex area only occupies 36% of the capture portions 86, 88 due to the fast releasing of flow from chamber outlets 90, 92 ($Q_1=Q_2=Q_3=133$ μL/min). At r/R=10, the vortex area increases occupying 50% as the flow rate in the chamber outlets 90, 92 decreases respectively ($Q_1=Q_3=334$/min and $Q_2=333$ μL/min). As the ratio increases to r/R=50, the vortex area enlarges to occupy 73% of the capture portions 86, 88. The experimental results demonstrate the effect of resistance network on particle releasing (FIG. 11F-1-F-3). At r/R=1 or r/R=10, the 23 μm diameter particle exits through the chamber outlets 90 without recirculation in the vortex 98. However, at r/R=50, due to the large vortex dimension, and, rather than travelling along the sheath 102 and out of the first and second chamber outlets 90, 92, particles 28 are trapped inside the vortex 98, thus diminishing the filtering and separation effects of the device 80. This trapping effect is shown in FIG. 11F-3 where r/R=50 and is represented by the larger shaded area. Where r/R=1 or 10, rather than exhibiting behaviour as shown in FIG. 11F-3, particles form a stream and travel to a chamber outlet 90 or 92. Notably, these results are characteristic of a specific design parameters, and neither the results nor the specific design parameters discussed in this, or any other example discussed herein, are not meant to be limiting. Specifically, with the alteration of other characteristics of the device 80, such as Re, it is possible to separate particles 28 with a device 80 having a range of r/R of about 1 to 100. Thus, designing the appropriate resistance ratio (r/R) is essential for successful particle separation and continuous releasing.

There are many manners in which each embodiment of the device may be manufactured. For example, the device can be made from polydimethylsiloxane, the polydimethylsiloxane being bonded to a glass slide or lab-on-a-chip system. The microchannels, chambers and outlets may be fabricated using photolithography. The method of manufacture listed here is not meant to be exhaustive. For example, other possible materials and methods include thermoplastics which are injection molded, roll-to-roll processed, or hot embossed. Other methods and materials of manufacture will be readily apparent to the person skilled in the art and therefore the person skilled in the art will be able to manufacture each embodiment of the microfluidic device described herein.

While the present invention has been illustrated by a description of various preferred embodiments, and while these embodiments have been described in some detail, it is not the intention of the Applicants to restrict or in any way limit the scope of the appended claims to such detail. Additional advantages and modifications will readily appear to those skilled in the art. The various features of the invention may be used alone or in any combination, depending on the needs and preferences of the user. This has been a description of the present invention, along with the preferred methods of practicing the present invention as currently known. However, the invention itself should only be defined by the appended claims.

What is claimed is:

1. A microfluidic device for separating particles, comprising:
a first, upstream linear microchannel having a first aspect ratio defined as a height of said microchannel divided by a width of said microchannel and a length $L_1$ in order to allow the particles directed therein to focus into a first equilibrium position in the first microchannel,
a second, downstream linear microchannel in fluid communication with the first microchannel, the second microchannel having a second aspect ratio and a length $L_2$, effective so that at least a portion of the particles directed into the second microchannel exit the first equilibrium position and experience a first migration away from a center axis of second microchannel and towards walls of the second microchannel, and a second migration towards a second equilibrium position, and the second migration to the second equilibrium position ends at distance X from a beginning of the second microchannel;
a plurality of outlets disposed before distance X and configured to receive the portion of the particles during the second migration thereof before the portion of the particles focus to the second equilibrium position in the second microchannel; and
wherein the first aspect ratio is greater than one and the second aspect ratio is less than one.

2. The microfluidic device of claim 1, wherein:
the particles further comprise first and second particles of a first diameter $a_1$ and second diameter $a_2$, respectively, $a_1$ being greater than $a_2$;
the first particles and second particles reach the second equilibrium position in the second microchannel at distances $X_1$ and $X_2$ from the beginning of the second microchannel, respectively, wherein $X_1$ is less than $X_2$;
the plurality of outlets is disposed between $X_1$ and $X_2$; and
each outlet is positioned to receive at least a portion of either the first or second particles therein.

3. The microfluidic device of claim 2, further comprising:
a first outlet disposed after distance X, and aligned with the second equilibrium position and receiving the first particles after the first particles focus into the second equilibrium position; and
at least a second outlet accepting the second particles.

4. The microfluidic device of claim 3, further comprising a third outlet, wherein the first outlet is between the second and third outlets.

5. The microfluidic device of claim 3, further comprising:
a first receptacle in fluid communication with the first outlet, thereby receiving the first therein; and
a second receptacle in fluid communication with at least the second outlet, thereby receiving the second particles therein.

6. The microfluidic device of claim 2, wherein $a_1$ is at least about 1 µm greater than $a_2$.

7. The microfluidic device of claim 2, wherein:
the particles further comprise third particles of a third diameter $a_3$, $a_3$ being less than $a_1$ and $a_2$;
the third particle reaches the second equilibrium position in the second microchannel at distance $X_3$ from the beginning of the second microchannel, wherein $X_3$ is greater than $X_1$ and $X_2$; and
each outlet is positioned to accept either the first, second or third particles therein.

8. The microfluidic device of 1, wherein the number of outlets required to separate the particles corresponds to an amount N of differently sized particles.

9. The microfluidic device of 8, wherein the number of outlets required is calculated with the formula 2N−1.

10. A method of separating a plurality of particles from a portion of a fluid medium, comprising:
directing the plurality of particles into a first linear microchannel having a first aspect ratio and length $L_1$;
focusing at least a portion of the particles into a first equilibrium position in the first microchannel;
directing the particles into a second linear microchannel in fluid communication with the first microchannel, the second microchannel having a second aspect ratio and length $L_2$, whereby a portion of the particles experience a first migration away from a center axis of second microchannel and towards walls of the second microchannel, and a second migration to a second equilibrium position, the second migration ending at distance X from a beginning of the second microchannel; and
directing at least the portion of the particles into a plurality of outlets in fluid communication with the second microchannel during the second migration before the portion of the particles focuses to the second equilibrium position by positioning a plurality of outlets before X; and
the particles further comprise first and second particles of a first diameter $a_1$ and second diameter $a_2$, $a_1$ being greater than $a_2$;
the first and second particles focus to the second equilibrium position in the second microchannel at distances $X_1$ and $X_2$ from the beginning of the second microchannel, respectively, wherein $X_1$ is less than $X_2$, and the method further comprises:
positioning the plurality of outlets between $X_1$ and $X_2$, each outlet positioned to accept either the first or second particles therein.

11. The method of claim 10, further comprising:
directing the portion of the particles focusing to the second equilibrium position into a first outlet aligned with the second equilibrium position; and
directing the portion of the particles not focusing to the second equilibrium position in at least a second outlet.

12. The method of claim 10, further comprising:
directing the first particles into a first outlet aligned with the second equilibrium position; and
directing the second particles into at least a second outlet.

13. The method of claim 10, wherein:
the particles further comprise third particles of a third diameter $a_3$, $a_3$ being less than $a_1$ and $a_2$;
the third particles focus to the third equilibrium position in the second microchannel at distance $X_3$ from the beginning of the second microchannel, wherein $X_3$ is greater than $X_1$ and $X_2$ and the method further comprises:
positioning the outlets to said first, second or third particles.

14. The method of claim 13, further comprising:
directing the first particles into a first outlet aligned with the second equilibrium position; and
directing the second and third particles into at least a second outlet.

15. The method of claim 10, wherein the second aspect ratio is less than one and the first aspect ratio is greater than one.

16. The method of claim 10, further comprising:
directing the first particles into a first outlet, the first outlet aligned with the second equilibrium position; and
directing the second particles into second and third outlets, wherein the first outlet is between the second and third outlets.

17. The method of claim 10, further comprising:
depositing the first particles into a first receptacle in fluid communication with the first outlet; and
depositing the second particles into a second receptacle in fluid communication with at least the second outlet.

18. The method of claim 17, further comprising:
increasing at least one of $L_1$ or $L_2$ according to an alteration of X.

19. A method of separating a plurality of particles from a portion of a fluid medium, comprising:
directing the plurality of particles into a microchannel having a first aspect ratio and length L;
focusing at least a portion of the particles into a first equilibrium position in the microchannel;
directing the particles into a chamber in fluid communication with the microchannel, the chamber having a second aspect ratio and further comprising symmetric first and second capture portions, wherein the first capture portion has a first outlet and the second capture portion has a second outlet, the chamber further comprising a third outlet aligned with the microchannel, thereby defining a main flow area in the chamber between the microchannel and main outlet, the main flow area also defined as being between the first and second capture portions; wherein:
upon entering the chamber, the equilibrium position of the particles changes and the particles migrate away from a center axis of the chamber, the particles experience a first migration away from a center axis of the chamber, wherein a first portion of the particles migrating out of the main flow area enter the first and second capture portions;
directing the first portion of particles entering the first and second capture portion in the first and second chamber outlets; and
directing a second portion particles remaining in the main flow area in the main outlet.

20. The method of claim 19, further comprising:
directing at least a portion of the particles further into the first and second capture portions and towards the first and second capture outlets with a flow, the flow due to first and second fluid vortices in the first and second capture portions, respectively.

21. The method of claim 20, further comprising:
adjusting the relative fluidic resistances of the chamber outlets and the main outlet, thereby altering the sizes of the first and second fluid vortices.

22. The method of claim 21, wherein the adjusting step is performed by adjusting the length or cross-sectional area of at least one of the outlets.

23. The method of claim 20, further comprising:
adjusting at least one of the flow rate or the viscosity of the fluid medium, thereby altering the sizes of the first and second fluid vortices.

24. The method of claim 19, further comprising:
depositing the first portion of particles in a first receptacle in fluid communication with the first and second chamber outlets; and
depositing the second portion of particles in a second receptacle in fluid communication with the main outlet.

25. The method of claim 19, wherein the particles further comprise first and second particles of a first diameter $a_1$ and second diameter $a_2$, $a_1$ being greater than $a_2$ and the method further comprises:
directing the first particles into the first and second chamber outlets after the first particles migrate into the first and second capture portions; and
directing the second particles into the main outlet after the second particles remain in the main flow area.

26. The method of claim 25, wherein $a_1$ is at least about 1 μm greater than $a_2$.

27. The method of claim 19, further comprising:
adjusting at least one of the flow rate or the viscosity of the fluid medium, thereby affecting the distance of first migration of the particles.

28. The method of claim 19, further comprising:
fluidicly communicating the first microchannel with a fluid source, a fluid in the fluid source containing the particles.

* * * * *